March 23, 1937.  W. A. DUFFIELD  2,074,781
VARIABLE SPEED POWER TRANSMISSION
Filed Jan. 10, 1936
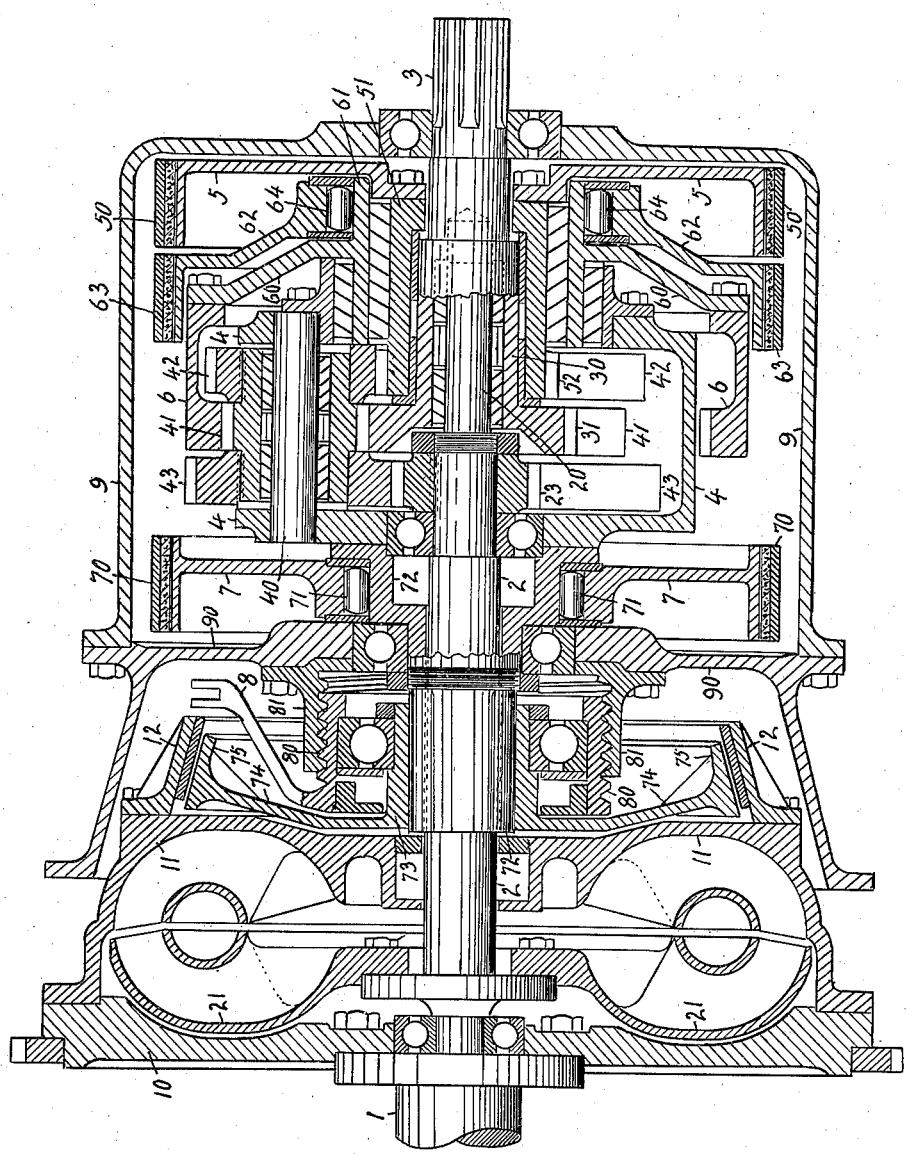
INVENTOR
William A. Duffield
BY
Sanbury A. Suddut
ATTORNEY Patented Mar. 23, 1937

2,074,781

UNITED STATES PATENT OFFICE 2,074,781

VARIABLE SPEED POWER TRANSMISSION

William A. Duffield, Montreal, Quebec, Canada, assignor to Juno Corporation Limited, Montreal, Quebec, Canada, a corporation Application January 10, 1936, Serial No. 58,497

5 Claims. (Cl. 74—293)

This invention relates to a variable speed transmission and particularly to mechanism including a fluid clutch which is adapted to provide a manually controlled change of speed suitable for motor vehicles and the like.

The object of the invention is to provide a variable speed mechanism controlled by hand in which there is no interruption of power when changing from one speed to another and the usual neutral position in changing speed is eliminated.

A further object is to provide a mechanism employing a fluid clutch in which at high speed or direct drive the slippage of the fluid clutch is reduced to a minimum.

Further objects will be set forth hereinafter.

The invention consists briefly in a drive through a fluid clutch to a planetary reduction gear and thence to a tail shaft, with means to provide a second speed and a high speed or direct drive, either entirely through the fluid clutch or partly through the gear train.

It also includes a reverse drive through the planetary gear.

Reference is made to the accompanying drawing, in which:

The figure is a vertical longitudinal section through the axis of the shafts.

Referring to the drawing:

The power shaft 1 is bolted to the fly wheel 10, which is bolted to the driver 11 of the fluid coupling.

The main shaft 2 journalled in the fly wheel 10, with its extension 20 journalled in the sleeve 30 of the tail shaft 3.

The runner 21 of the fluid coupling is bolted to a flange on the main shaft 2.

The pinion 23 is keyed to the main shaft 2.

The carrier 4 journalled on the bearings on the main shaft 2 carries the pins 40 on which are journalled the integral gears 41, 42, and 43.

The gear 43 meshes with the pinion 23.

The gear 41 meshes with the pinion 31 on the end of the sleeve 30 of the tail shaft 3.

The gear 42 meshes with pinion 52 on the end of the sleeve 51 bolted to the brake drum 5 controlled by the brake band 50.

An annulus 6 meshes with the gear 41, this annulus 6 is bolted to a disc 60 extending from a sleeve 61. This sleeve is journalled between bearings about the sleeve 51.

An over running clutch 64 carried by a brake drum 62 bears on the sleeve 61. A brake band 63 controls the drum 62.

Bolted to the carrier 4 is a splined sleeve 72 loosely mounted on the main shaft 2. An over running clutch 71 carried by a brake drum 7 bears on the sleeve 72, and is controlled by the brake band 70.

Sliding on the splined sleeve 72 is a sleeve 73 which carries a disc 74 with a friction cone 75.

The driver 11 has an extension flange 12 adapted to seat the cone 75.

The sleeve 73 is moved axially by a screw 80 threaded in a sleeve 81 which is bolted to the partition 90 of the frame 9.

A forked lever 8 fastened to the screw 80 rotates this screw 80 and slides the sleeve 73 on the splined sleeve 72.

The operation is as follows:—

The drive from the power shaft 1 is through the fly wheel 10 to the driver 11.

As the runner 21 couples up with the driver 11 the main shaft 2 rotates the pinion 23.

As the carrier 4 is held from reverse rotation by the over running clutch 71, the pinion 23 rotates the integral gears 43, 41, and 42.

The gear 41 drives the tail shaft 3 at reduced speed through the pinion 31.

The sleeve 51 is free as the band 50 is loose.

The annulus 6 is rotated in reverse direction by the gear 41 and the sleeve 61 is free from the over running clutch 64.

When the band 63 closes the over running clutch 64 the annulus is held and the gear 41 rotates the carrier in the same direction as the main shaft. This rotation of the carrier diminishes the reduction effect of the gears.

Then the cone 75 is moved to seat in the flange 12, by the lever 8. The drive is now direct from the driver 11 through the carrier to the tail shaft, and through the runner 21 to the shaft 2.

The operation of the transmission is controlled by three band brakes, one for low speed, one for intermediate speed and one for reverse with a cone friction clutch for high speed or direct drive.

These controls can be operated by simple mechanism from the steering wheel by well known means. The changes are made without any interruption in the power, smoothly and without shock or sudden strain on the mechanism.

In the high speed or direct drive when the friction clutch is closed the power delivered from the prime mover is divided into two drives one through the fluid clutch to the main shaft and the other to the planetary gearing where they combine to drive the tail shaft.

By reducing the amount of power to the fluid clutch the slippage in that clutch is also reduced and the loss of power through slippage cut down materially.

What I claim, is:—

1. In a manual control variable speed transmission, a casing, a drive shaft, having a fly wheel bolted to it, a main shaft, a fluid coupling having a driver and a runner mounted about the main shaft, the driver secured to the fly wheel, the runner secured to the main shaft, a tail shaft journalled in the casing, bored to journal an extension of the main shaft, adjacent pinions on the main and tail shafts, a carrier journalled on the main shaft, an over running clutch connected to the carrier, means to release the clutch, a set of pins mounted in the carrier parallel to the main shaft, triple integral gears journalled on each pin, two sets of which mesh with the pinions, an annulus meshing with the gears meshing with the tail shaft pinion, means to hold the annulus, a sleeve journalled on the tail shaft having a pinion meshing with the third set of the integral gears and means to hold this pinion.

2. In a manual control variable speed transmission, a casing, a drive shaft, having a fly wheel bolted to it, a main shaft, a fluid coupling having a driver and runner mounted about the main shaft, the driver secured to the fly wheel, the runner secured to the main shaft, a tail shaft journalled in the casing, bored to journal an extension of the main shaft, adjacent pinions on the main and tail shafts, a carrier journalled on the main shaft, an over running clutch connected to the carrier, means to release the clutch, a set of pins mounted in the carrier parallel to the main shaft, triple integral gears journalled on each pin, two sets of which mesh with the pinions, an annulus meshing with the gears meshing with the tail shaft pinion, means to hold the annulus, a sleeve journalled on the tail shaft having a pinion meshing with the third set of the integral gears and means to hold this pinion, a sleeve extension connected to the carrier and a friction clutch for coupling the sleeve and the driver of the fluid coupling, means to control the friction clutch.

3. In a manual control variable speed transmission, a casing, a drive shaft, having a fly wheel bolted to it, a main shaft, a fluid coupling having a driver and runner mounted about the main shaft, the driver secured to the fly wheel, the runner secured to the main shaft, a tail shaft journalled in the casing, bored to journal an extension of the main shaft, adjacent pinions on the main and tail shafts, a carrier journalled on the main shaft, an over running clutch connected to the carrier, means to release the clutch, a set of pins mounted in the carrier parallel to the main shaft, triple integral gears journalled on each pin, two sets of which mesh with the pinions, an annulus meshing with the gears meshing with the tail shaft pinion, means to hold the annulus, a sleeve journalled on the tail shaft having a pinion meshing with the third set of the integral gears and means to hold this pinion, means to couple the driver of the coupling to the carrier whereby the drive is divided between the coupling and the gear train.

4. In a manual control variable speed transmission, a casing, a drive shaft, having a fly wheel bolted to it, a main shaft, a fluid coupling having a driver and runner mounted about the main shaft, the driver secured to the fly wheel, the runner secured to the main shaft, a tail shaft journalled in the casing, bored to journal an extension of the main shaft, adjacent pinions on the main and tail shafts, a carrier journalled on the main shaft, an over running clutch connected to the carrier, means to release the clutch, a set of pins mounted in the carrier parallel to the main shaft, triple integral gears journalled on each pin, two sets of which mesh with the pinions, an annulus meshing with the gears meshing with the tail shaft pinion, means to hold the annulus, a sleeve journalled on the tail shaft having a pinion meshing with the third set of the integral gears and means to hold this pinion, means to reduce the drive through the coupling and direct it partly through the gear train.

5. In a change speed transmission the combination of a casing, a drive shaft, a fly wheel bolted thereon, a main shaft, a fluid coupling having a driver and runner mounted about the main shaft, the driver secured to the fly wheel, the runner secured to the main shaft, a tail shaft journalled in the casing, bored to journal the main shaft, adjacent pinions on the main and tail shafts, a carrier journalled about the shafts, having an over running clutch, controlled by a brake mechanism, triple integral gears journalled on the carrier, the large gear meshing with the main shaft pinion, the small gear meshing with the tail shaft pinion, the intermediate gear in size meshing with a pinion controlled by a brake band for reverse drive.

WILLIAM A. DUFFIELD.